United States Patent [19]

Lindstrom et al.

[11] 4,321,103

[45] Mar. 23, 1982

[54] MECHANISM FOR APPLYING MERCHANDISING LABELS TO PACKAGES/OBJECTS OF DIFFERENT WEIGHTS AND DIMENSIONS

[75] Inventors: John W. Lindstrom, Newfield; Walter A. Boyd; Victor Del Rosso, both of Ithaca, all of N.Y.

[73] Assignee: Hi-Speed Checkweigher Co., Inc., Ithaca, N.Y.

[21] Appl. No.: 190,817

[22] Filed: Sep. 25, 1980

[51] Int. Cl.³ .......................... B44B 9/00; B32B 1/08

[52] U.S. Cl. .................................. 156/351; 156/358; 156/360; 156/362; 156/363; 156/364; 156/384; 156/540; 156/541; 156/556; 156/566; 156/DIG. 33

[58] Field of Search ............... 156/234, 238, 351, 358, 156/360, 362, 363, 364, 384, 540, 541, 556, 566, DIG. 33

[56] References Cited

U.S. PATENT DOCUMENTS

| | | | |
|---|---|---|---|
| 2,776,068 | 1/1957 | Johnson | 156/DIG. 33 |
| 4,030,959 | 6/1977 | Meisner | 156/566 |
| 4,119,482 | 10/1978 | Bennett | 156/351 |

*Primary Examiner*—Marion McCamish

*Attorney, Agent, or Firm*—Bean, Kauffman & Bean

[57] ABSTRACT

There is disclosed, in combination with a conveyor for moving packages or other objects of different sizes and shapes from an input station via a customer charge-calculating and labeling station, an improved printed label transport system carrying the labels to the applicator. The label transport and applying system is of a swinging "elbow" type and is of such geometry as to obviate previous problems concerning labeling of articles of varying sizes and shapes as they are being transported on a continuously delivering high speed product line conveyor. The label print system applies all pertinent data on a single label, and the mechanism provides an improved "final touch" pressure against each label incidental to the applying operation. The label transport system includes a sidewise label scanning device which monitors for correctness the indicia printed thereon.

15 Claims, 3 Drawing Figures

Fig. 4.

MECHANISM FOR APPLYING MERCHANDISING LABELS TO PACKAGES/OBJECTS OF DIFFERENT WEIGHTS AND DIMENSIONS

BACKGROUND AND BRIEF DESCRIPTION OF THE INVENTION

This invention provides an improved label transporting and applying mechanism for use in combination with a conveyor system for continuously moving packages/objects of different weights, sizes, and shapes from a loading station via a cost-charge calculating station, to a package/object discharge station. Typically, such labels are selectively printed to bear essential indicia such as product identification; price per unit weight; package contents weight (or quantity); total price; and a separate "universal product code" (U.P.C.) indicia carrying label. Then upon arrival of such objects or packages at a predetermined point along the conveyor line printed labels appropriate to that package are affixed thereto by label applicators. U.S. Pat. No. 4,119,482 for example discloses a currently employed type quantity/-weight/price per pound label applying system. Other patents known to applicant as relating generally to the art discussed herein are U.S. Pat. Nos. 3,885,705; 4,201,619; 4,201,621; 4,207,131; 4,217,164; and co-assigned U.S. Pat. Nos. 3,955,665; 4,025,382; 4,049,068, and 4,124,436.

The present invention, however, provides an improved mechanism and method for transporting printed pressure-sensitive type labels to the applicator and affixing them to packages or objects of varying sizes and shapes. The label transport and applicator system of the invention features a novel two-belt label transport arrangement in combination with an "elbow" type pivotal linkage support for the label applying roller; whereby the labels are transported with optimum accuracy in synchronism with the package conveying system, and are then more securely fastened thereto in improved manner.

DETAILED DESCRIPTION OF THE INVENTION

Figures 1, 4:
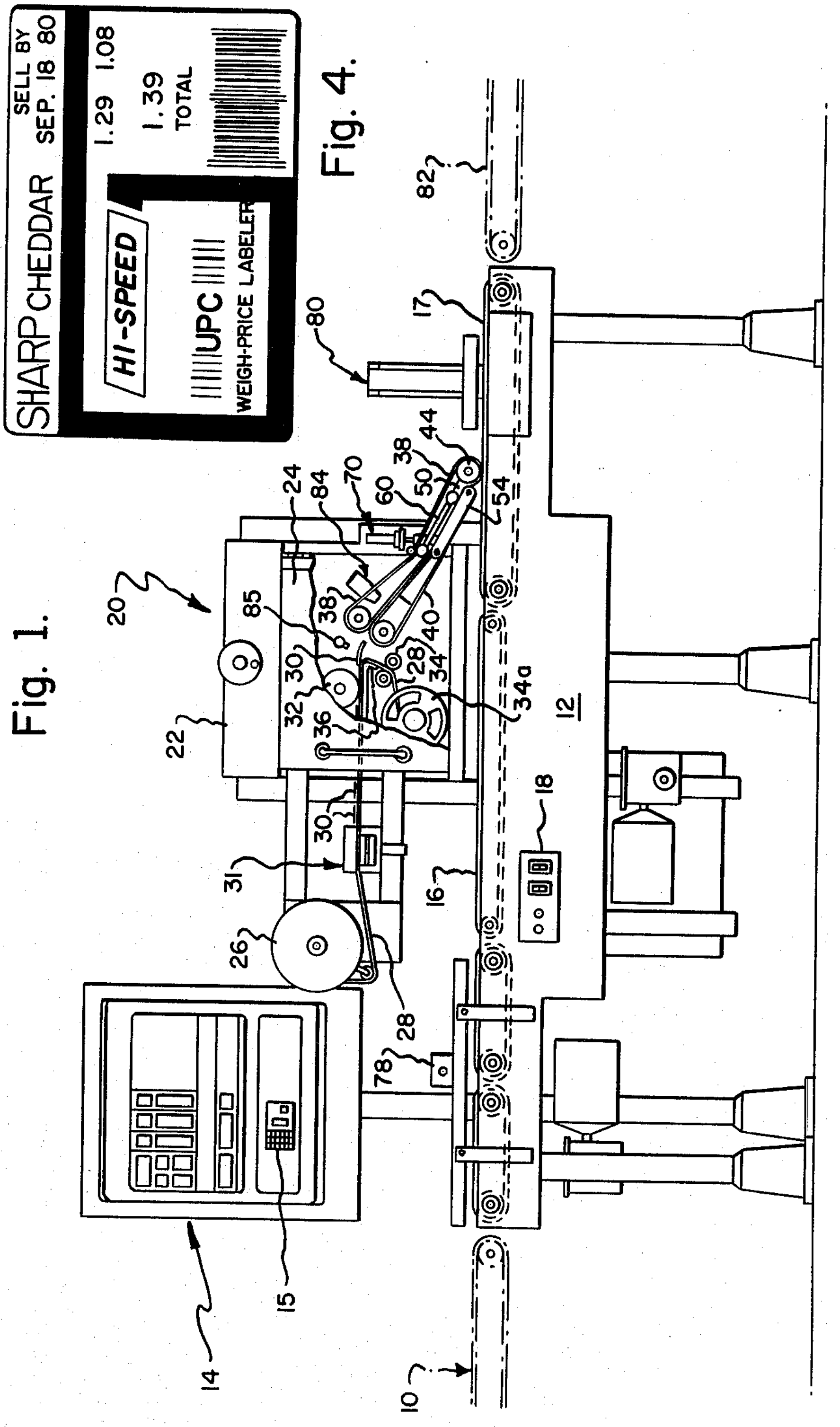
FIG. 1 is an overall side elevational view of a co-developed package/object high speed operating weighing and price/weight labeling system; wherein a label transport and applying mechanism of the present invention may be beneficially employed; a portion of the cabinet enclosing the label printing and transport apparatus being broken away to show the mechanism.
FIG. 4 illustrates the format of a printed label as may be typically furnished by the apparatus of the present invention.

As illustrated in FIG. 1 by way of example, the mechanism of the invention may be embodied in a system for processing a continuously conveyed supply (at high speed) of random weight and random shaped and height-sized merchandise articles, such as may for example be of conventional hard-packaged or free-wrapped forms. Such articles may be conveyed as by means of an input conveyor as shown at 10 to pass over a weighing station 12 which transmits to a computer unit 14 the measured weight of each such article before it is removed from the scale such as by means of a conveyor 16 for delivery to a second conveyor 17. Mechanisms for such purposes are disclosed for example in our co-assigned earlier U.S. Pat. Nos. 3,955,665; 4,049,068; 4,114,707 and 4,124,436. As illustrated at 15 herein, the computer front panel typically includes a unit price input keybard by which the system attendant inserts the appropriate U.P.C. hammer set up; the product designation; price per unit weight, etc. An overall machine/-conveyor operational control panel is also furnished, such as is shown at 18.

The conveyor 17 presents the previously weighed articles to the labeling unit of the present invention which extends from the combination label printing and transport unit which is illustrated generally at 20 (FIG. 1) as being housed in a cabinet 22 which has a hinged front cover door 24. The label supply system comprises a reel 26 which is rotatably supported by the cabinet to deliver a continuous web 28 carrying in spaced relation thereon label blanks 30. A combination commodity name and date printer as shown at 31 is employed to pre-print each such label according to the character of the merchandise being processed. The label is then carried into position under the price-weight U.P.C. printer head such as is illustrated at 32; the web 28 being pulled along as by means of a pinch roller system 34 and take-up reel 34*a*. Incidental to transport of the web from beneath the printer 32 and to the take-up reel, it is pulled over a sharp-angled "stripper plate" 36, which operation causes the labels to peel off the web 28 and to lean into the "nip" between a pair of endless label transport conveyor belts 38,40.

Figure 3:
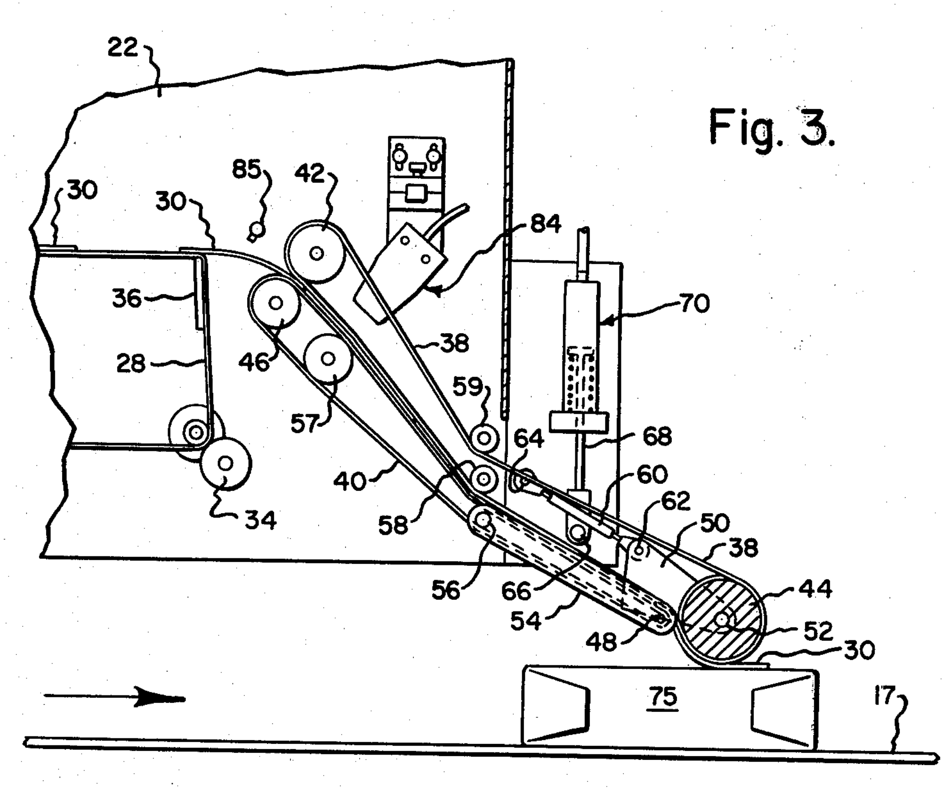
FIG. 3 is a view corresponding to FIG. 2 but illustrating the label applying mechanism in operation.

The labels 30 are undercoated with pressure-sensitive adhesive, whereby they cling to the web 28 while being printed, but because of their relative stiffness are released therefrom and peel off the web 28 as it trains around the stripper plate 36 and then lean into the "nip" between the belts 38,40, as is best shown at FIG. 3. A compressed air jet nozzle as shown at 85 may be provided if required to blow down upon the labels at this point, in order to insure their entry into the "nip" of the conveyor belt system. The belts 38,40 are of any suitable flexible material construction, but in any case are at least surface-coated with a release agent. For example, they may be surface-coated or throughout impregnated with silicone; or perhaps totally fabricated of silicone. Thus, the belts are adapted to carry the labels 30 from the printer to the conjoint label-package/article receiving station in adhesive face-down positions; the belts cooperating throughout the system to firmly maintain, therebetween, the labels in properly spaced apart ahdesive-down relation until such time as they peel off under the roller 44 onto the computer-assigned packages; as will be more fully explained hereinafter.

Figure 2:
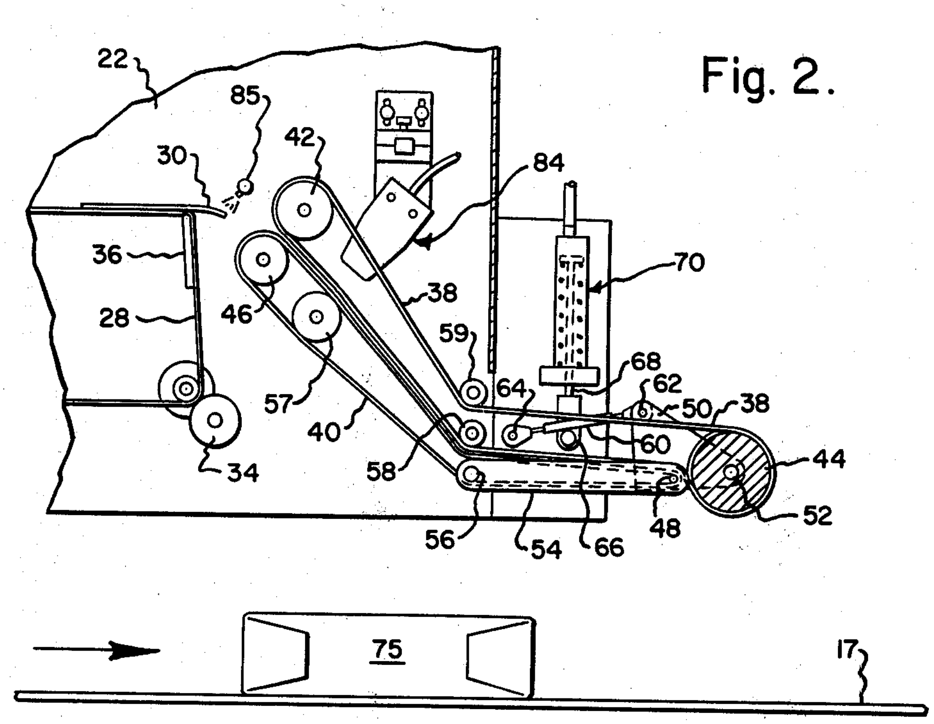
FIG. 2 is an enlarged scale fragmentary view of a portion of FIG. 1; showing the label applying mechanism thereof in retracted, inoperative position.

More specifically, as best shown at FIGS. 2 and 3, the belt 38 travels at its nipping end around a roller 42 which is rotatably carried by the cabinet structure. At its nether end, the belt travels around the "label apply" roller 44, the support of which will be explained more fully hereinafter. Preferably, the roller 44 will be formed of sponge rubber or the like, so as to be compliant to irregular surfaces upon which the labels are to be applied. The belt 40 travels as shown herein at its nipping end around a roller 46 which is also carried by the cabinet structure. The belt 40 is driven at the same speed but in opposite direction to that of the belt 38 so as to provide the requisite label squeezing and transport operation therebetween. At its nether end the belt 40 trains around a roller 48 which is rotatably carried by one arm of a bell-crank member 50, whereas another arm of the bell-crank 50 rotatably mounts thereon as indicated at 52 the roller 44 previously described.

The axle of the roller 48 also pivotally supports one end of a strut 54 which at its opposite end is pivotally mounted on the cabinet 22 by means of the axle of a roller as is shown at 56. The roller 56 also functions as an idler roller against which the belt 40 travels. Idler rollers 58,59 are also rotatably mounted on the cabinet as shown; and thus it will be appreciated that the belts 38,40 as they travel throughout the transport system are caused to move in close-together (label-compression-holding) relation. The length of the strut 54 (between its functionally opposite end pivotally supporting axles) and the vertical locational relationship of the position of the axle 56 as it is mounted on the cabinet structure 22 is most important. Thus, as shown herein by way of example, the strut pivoting axle/roller 56 is vertically disposed on the cabinet so as to over-ride the vertical heights of the articles/packages scheduled for the labeling process while extending substantially horizontally therebeyond. Hence, the label apply control system will minimize (in the direction of package travel) undesirable variations of label emplacements on the computer-designated articles/packages.

It is also a particular feature of the transport system of the present invention that although the surfaces of the belts 38,40 are of "silicone nature" they are nevertheless (by reason of the squeegee action of the belts) enabled to transport therebetween at high speed the printed labels to the label apply station, while at the same time guarding against the possibility of labels shifting between the belts in and out of directional alignments and/or delivery-emplacement synchronism with their computer-designated packages which are simultaneously being transported along the product line by the conveyors 16,17. This constant and uniform belt tension arrangement persists at all times throughout the belt system regardless of vertical "elbow" type swings of the label apply component of the transport device. However, upon arrival at the label apply station the silicone surface functions as a release agency and permits the labels to freely peel away from the belts and to roll into proper positions onto the appropriate packages under the roller 44.

Also as illustrated herewith only by way of one example, a tie-rod 60 may be arranged to pivotally connect at one end to the bell-crank 50 as shown at 62, and at its other end to be pivotally connected to the stationary cabinet as illustrated at 64. Thus, the roller 44 and the transport belt transfer system exteriorly of the cabinet 22 may be arranged to be free to swing vertically by gravity (unless otherwise restrained) toward the article conveyor 17, and the weight thereof will determine the pressure applied by the mechanism against the article therebelow unless otherwise augmented. A laterally extending lift arm 66 carried by a piston 68 is employed to project laterally underneath the tie-rod 60; the piston 68 being operative by means of any suitable hydraulic or pneumatic or electromatic mechanism or the like as is shown at 70, which is under control of the computer unit 14 in order to synchronize raising/lowering of the roller 44 incidental to applying appropriate labels to the articles being processed. Thus, it will be appreciated that the position of the label applying roller as controlled by the cylinder 70 may be operative in a "permissive" mode; permitting only the weight of the apparatus to determine the pressure supplied upon each label against its designated article on the production line. However, in event it is desired to provide for a more rapid operation, this "permissive" system may be augmented by simply adding a powered actuation thereto. For example, the piston-cylinder unit 70 may be provided of the double acting type and coupled to the tie-rod 60 so as to also appropriately press downwardly thereon during the arm-lowering label applying phases of operation.

As explained for example in previously referenced U.S. Pat. No. 4,049,068, a photosensor such as shown at 78 (FIG. 1) is employed to detect the presence of an incoming package; to control operations of the conveyors, and to initiate the computing cycle whereby the net weight of the packaged commodity is put into the computer. The computer then supplies the print heads 31 and 32 with appropriate data, and the printed labels are thereupon supplied to the labeling roller 44 in synchronism with arrival thereat of the package which initiated the cycle.

Thus, in summary, pre-packaged, hard-wrapped, or free-wrapped (as well as unwrapped) articles of merchandise such as are illustrated generally at 75 herewith (FIGS. 2 and 3) are transported by the system of the present invention by means of the conveyor 17 to receive appropriate weight-price, etc. labels as furnished by the belts 38,40. The articles are then conveyed past a "project reject" checking device such as is shown at 80 (FIG. 1); for possible reject from the product line before delivery to the output conveyor 82 if not conforming to prescribed specifications. A scan-reading device such as is shown at 84 (FIGS. 2 and 3) is employed to check for correctness the labels 30 as they travel between the belts 38,40; said device being coupled to the output of the computer 14 for reject of a package at station 80 in the event it is determined that a label placed thereon is misprinted. Thus, it is insured that each label as printed and transferred to the assigned article on the product line is correct in all respects.

What is claimed is:

1. In a high speed articulated product delivery and individual article net weight, price per unit, and total price label applying system; wherein the products are separately weighed and assigned in sequence by means of a computer-memory and driver unit as they are being carried along by conveying means in synchronism with a label printing device so as to arrive at a pressure-sensitive label applying station in synchronism with their appropriate customer information and take-away price bearing labels; the improvement comprising:

a label transport device including paired same-speed operating and oppositely running endless conveyor belts, each of which are carried by rollers at their opposite ends and have their co-directionally running flights arranged in pressed-together relation;

said transport means being disposed at one end thereof to receive between said belts said labels in sequence and to transport them in positionally-maintained relation between said belts to exit therefrom at the other end of said transport device and to be thereat rolled and applied by one of said rollers into adhesively fixed relation upon their pre-assigned particles as they are being carried along by said conveying means.

2. A system as set forth in claim 1 wherein the one of said belts which receives the adhesive-coated sides of said labels is surfaced with an adhesive release agent.

3. A system as set forth in claim 1 wherein the label exiting end of said transport device, including said rollers located thereat, is substantially vertically displaceable with respect to said one end thereof to accommodate thereunder articles of different heights, whereby the labels are placed upon articles of varying heights with only minimum variations in their longitudinal emplacements.

4. A system as set forth in claim 3 wherein the height of the label exiting end of said transport device is regulatable to adapt to different height series of articles of similar height, but is free to lift and to accommodate passage and label applications thereunder upon articles of greater heights.

5. A system as set forth in claim 1 wherein said transport device includes intermediately of the ends thereof rollers around which said belts travel; said rollers being so disposed that throughout the range of transport of said labels therebetween said belts continuously apply to said labels compression forces sufficient to maintain said labels therebetween in prescribed aligned and spaced apart relation.

6. A system as set forth in claim 1 wherein said one roller comprises the terminal roller of one of said belts and extends in the direction of article travel beyond the terminal roller of the other of said belts and functions as a press roller to emplace the labels upon the articles.

7. A system as set forth in claim 6 wherein said press roller is compliant to conform to article dimension and contour variations without damage to the delivered products.

8. A system as set forth in claim 1 wherein means are provided to alternately lift and lower the label applying roller end of said transport device, with respect to the other end thereof, in synchronism with passage of articles thereunder.

9. A system as set forth in claim 8 wherein said last mentioned means comprises a single direction acting lift device, and gravity is employed to lower said roller label applying end of said device.

10. A system as set forth in claim 8 wherein said last mentioned means comprises a double acting piston-cylinder device.

11. Apparatus for applying separate labels to articles being transported along a predetermined path by conveying means; each of said labels having a pressure-sensitive adhesive-coated side and an indicia receiving side and is furnished in linearly spaced apart relation on a supply web in adhesive-down positions thereon; said apparatus comprising:

a label transport device comprising paired same-speed oppositely running endless conveyor belts carried by rollers at their opposite ends and having their co-directionally running flights arranged in pressed-together relation;

said transport device being disposed at one end thereof to receive therebetween said web and said labels thereon in sequence to transport them in prescribed positionally-related manner between said belts to discharge them therefrom at the other end of said transport device and to be rolled and applied by one of said rollers onto said articles as they progress with said conveying means.

12. An apparatus as set forth in claim 11 wherein said transport device is of two sections which are elbow-pivotally interconnected intermediately of its opposite ends, the label receiving end section of said device being positionally fixed relative to delivery of said label carrying web thereto, and the elbow connected section, including said rollers thereat, being thereby pivotal thereto in order to accommodate dimensional variations of each oncoming article.

13. An apparatus as set forth in claim 12 wherein the one of said belts which receives the adhesive-coated sides of said labels is surfaced with an adhesive release agent.

14. An apparatus as set forth in claim 12 wherein said transport device includes intermediately of the ends thereof rollers upon which said belts travel; said rollers being so disposed that throughout the range of transport of said labels therebetween said belts continuously apply against said labels compression forces sufficient to maintain said labels therebetween in prescribed aligned and spaced apart relation.

15. An apparatus as set forth in claim 14 wherein the height of said label applying end section is regulatable, but is also free to lift to accommodate passage thereunder of various height articles.

* * * * *